United States Patent
Hirota et al.

(10) Patent No.: US 8,250,160 B2
(45) Date of Patent: Aug. 21, 2012

(54) CHECKING DESTINATION EMAIL ADDRESSES AGAINST HISTORICAL ADDRESS INFORMATION

(75) Inventors: Kenji Hirota, Yamato (JP); Tomonori Sugiura, Yamato (JP); Masami Tada, Yamato (JP); Hidekuni Ueda, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 12/762,651

(22) Filed: Apr. 19, 2010

(65) Prior Publication Data

US 2010/0274860 A1    Oct. 28, 2010

(30) Foreign Application Priority Data

Apr. 24, 2009    (JP) .................... 2009-105837

(51) Int. Cl.
*G06F 15/16* (2006.01)
*G06F 15/173* (2006.01)
(52) U.S. Cl. ........................... 709/206; 709/225
(58) Field of Classification Search ........... 709/204–207, 709/223–226, 229; 726/2–7, 11–13, 26–30
See application file for complete search history.

(56) References Cited

U.S. PATENT DOCUMENTS

| | | | |
|---|---|---|---|
| 2004/0049696 A1* | 3/2004 | Baker et al. | 713/201 |
| 2007/0208868 A1* | 9/2007 | Kidd et al. | 709/229 |
| 2008/0010348 A1* | 1/2008 | Dawson et al. | 709/206 |
| 2009/0216678 A1* | 8/2009 | May et al. | 705/50 |
| 2010/0125891 A1* | 5/2010 | Baskaran | 726/1 |

FOREIGN PATENT DOCUMENTS

| | | |
|---|---|---|
| JP | 11-243412 | 9/1999 |
| JP | 2003030108 | 1/2003 |
| JP | 2007193717 | 8/2007 |
| JP | 2007-241807 | 9/2009 |

OTHER PUBLICATIONS

Yosuke Aragane, "A Study for Email Wrong Transmission", Information Processing Society of Japan, Jul. 4, 2007, vol. 2007, pp. 493-499, IPSJ Symposium Series.

* cited by examiner

*Primary Examiner* — Brendan Higa
(74) *Attorney, Agent, or Firm* — Law Office of Jim Boice

(57) ABSTRACT

An email is created that includes one or more destination email addresses, plus historical information regarding previously exchanged emails. Before sending this email, each of the destination email addresses is checked against the email addresses in the historical information and, if a destination email address (or the domain name of that destination address) is not found in the historical information, then a warning is displayed to alert the user to the fact that this historical information may be sent to an unintended recipient. In response to this warning, which may include a list of unapproved destination email address, the user may approve a previously unapproved destination email address, change the unapproved destination email address to one that has been previously approved, or enter a new distribution email to be substituted for the unapproved one. When creating the email, the user may also specify other approved email addresses.

15 Claims, 9 Drawing Sheets

HISTORY INFORMATION-CONTAINING EMAIL

CHECKING DESTINATION EMAIL ADDRESSES AGAINST HISTORICAL ADDRESS INFORMATION

CROSS-REFERENCE TO RELATED APPLICATIONS

Pursuant to 35 U.S.C. 119, Applicant claims a right of priority to Japanese Patent Application No. 2009-105837 filed 24 Apr. 2009.

BACKGROUND

The present invention relates to computers, methods and computer program products wherein destination email addresses are checked against historical email address information to prevent an email from being sent to an unintended recipient.

With the rapid progress of Internet technology, information has been frequently exchanged using emails. Upon receiving an email, the recipient may respond by creating an email that includes historical information regarding other emails previously exchanged between multiple users, including the received email. An email containing historical information may include a header containing a destination email address, a body containing the message to be sent, and a historical information section citing emails exchanged between multiple users. In the case where multiple users have exchanged emails containing historical information with each other several times, this historical information section may become enormous, making it difficult for the user to check and grasp all the historical information. For this reason, when sending an email containing historical information, the user may send the email to an unintended destination, to which the sender does not want to disclose the historical information.

In view of the foregoing, numerous email sending methods have been developed to prevent the user from sending an email to an unintended destination. For example, a user terminal disclosed in Japanese Published Unexamined Patent Application No. 2007-193717 ("Patent Document 1") includes an address book that stores email addresses and identification data such as the names, prefixes, company names, section names, job titles, postal addresses, and photos or illustrations of the owners of the email addresses. Each email address is associated with corresponding identification data and send/receive history data, such as the send/receive frequencies of previous emails and the send/receive dates and times. Before sending an email, the user terminal checks the data to be sent, which contains a destination email address, a destination name, an email body and the like, against the address book and the send/receive history file, so as to extract identification data and send/receive history data corresponding to the destination email address to give a warning to the user if necessary.

While the email sending method disclosed in Patent Document 1 includes determining whether a destination email address is stored in the address book, it does not include determining whether the destination email address is an intended destination to which the user is permitted to disclose the historical information section of the email. Accordingly, as long as the unintended destination is an email address stored in the address book, the email containing the historical information may be sent to even unintended destinations to which the users does not need or want to disclose the historical information. This presents the problem of indiscriminately disclosing historical information.

For example, assume that a user "A" has exchanged emails containing historical information on several occasions with a user B (in the company) and a user C (outside the company), whose email addresses are stored in the address book and that, in reply to a received email, the user A sends an email containing historical information that cites the received email. If the user A selects a user D (outside the company), whose email address is stored in the address book, as the reply destination and attempts to send the email containing the historical information thereto, the email sending method disclosed in Patent Document 1 will send the email to the user D. This is because the user D is stored in the address book and is therefore handled as users B and C are handled. As a result, disadvantageously, the contents of the email containing the historical information that user A has several times exchanged emails with users B and C will leak to user D, failing to maintain confidentiality.

SUMMARY

An apparatus according to a first aspect of the present invention includes: an email creation unit that creates an email containing historical information citing an email exchanged between a plurality of users; an address information collection unit that collects, as address information, a part or all of an email address contained in the historical information cited in the created email; an address information storage unit that stores the collected address information; a destination checking unit that checks whether a destination email address set in the email containing historical information contains the stored address information; and a warning information output unit that outputs warning information indicating that the destination email address does not contain the address information.

The apparatus according to the first aspect of the present invention preferably further includes an approval receiving unit that receives input of send approval information indicating approval for sending to an email address corresponding to the warning information outputted from the warning information output unit.

In the apparatus according to the first aspect of the present invention, the approval receiving unit may receive input of at least one of a domain name, a sub-domain name, and an email address as input of the send approval information.

The apparatus according to the first aspect of the present invention preferably further includes a destination change unit that changes an email address corresponding to the warning information outputted from the warning information output unit.

In the apparatus according to the first aspect of the present invention, a header of the created email containing historical information may contain at least one of a domain name, a sub-domain name, and an email address as the send approval information.

In the apparatus according to the first aspect of the present invention, the address information collection unit may collect the address information from the email exchanged between the plurality of users before the email containing historical information is created.

In the apparatus according to the first aspect of the present invention, the address information may be a domain name.

A method according to a second aspect of the present invention is a method executable by a computer configured to send or receive an email. The method includes: creating an email containing historical information citing an email exchanged between a plurality of users as historical information; collecting, as address information, a part or all of an email address contained in the history information cited in the created email containing historical information; storing the collected address information; checking whether a destination email address set in the email containing historical information contains the stored address information; and outputting warning information indicating that the destination email address does not contain the address information.

The method according to the second aspect of the present invention preferably further includes receiving input of send approval information indicating approval for sending to an email address corresponding to the outputted warning information.

In the method according to the second aspect of the present invention, input of at least one of a domain name, a sub-domain name, and an email address may be received as input of the send approval information.

The method according to the second aspect of the present invention preferably further includes changing an email address corresponding to the outputted warning information.

In the method according to the second aspect of the present invention, a header of the created email containing historical information may contain at least one of a domain name, a sub-domain name, and an email address as the send approval information.

In the method according to the second aspect of the present invention, the address information may be collected from the email exchanged between the plurality of users before the email containing historical information is created.

In the method according to the second aspect of the present invention, the address information may be a domain name.

A computer program product according to a third aspect of the present invention is a computer program product executable by a computer configured to send or receive an email. The computer program product causes the computer to function as: email creation means that creates an email containing historical information citing an email exchanged between a plurality of users as historical information; address information collection means that collects, as address information, a part or all of an email address contained in the historical information cited in the created email containing historical information; address information storage means that stores the collected address information; destination checking means that checks whether a destination email address set in the email containing historical information contains the stored address information; and warning information output means that outputs warning information indicating that the destination email address does not contain the address information.

The computer program product according to the third aspect of the present invention preferably causes the computer to further function as approval receiving means that receives input of send approval information indicating approval for sending to an email address corresponding to the warning information outputted from the warning information output means.

In the computer program product according to the third aspect of the present invention, the approval receiving means may be caused to function as means that receives input of at least one of a domain name, a sub-domain name, and an email address as input of the send approval information.

The computer program product according to the third aspect of the present invention preferably causes the computer to further function as destination change means that changes an email address corresponding to the warning information outputted from the warning information output means.

In the computer program product according to the third aspect of the present invention, a header of the created email containing historical information may contain at least one of a domain name, a sub-domain name, and an email address as the send approval information.

In the computer program product according to the third aspect of the present invention, the address information collection unit may be caused to function as means that collects the address information from the email exchanged between the plurality of users before the email containing historical information is created.

In a fourth aspect of the invention, a method, apparatus and computer program product is described in which a first email is created that comprises a header and historical information, the header comprises a first destination email address, and the historical information comprises a historical email address for a previously exchanged email. At least a portion of the historical email address contained in the historical information is stored as a first approved address. The first approved address is compared to a corresponding portion of the first destination email address and, in response to the corresponding portion of the first destination email address being different from the first approved address, a warning is outputted.

In a case where multiple users exchange emails containing historical information with each other, the present invention checks whether a destination email address of the email containing historical information contains address information indicating a part or all of an email address contained in the cited history information. This can prevent the historical information from being sent to an unintended destination, to which the user does not need to disclose the cited history information, thereby maintaining confidentiality.

DETAILED DESCRIPTION

Figure 1:
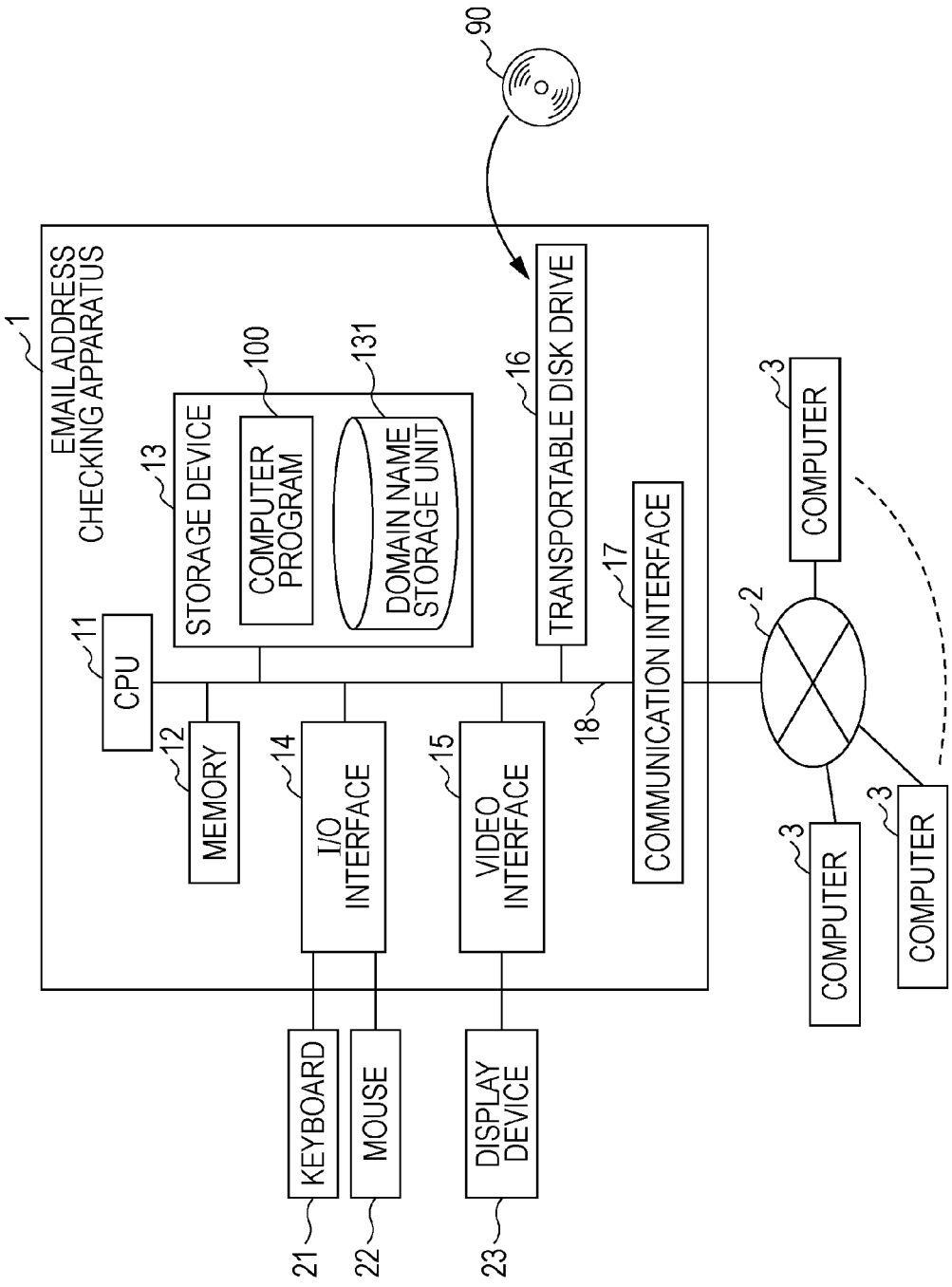
FIG. 1 is a block diagram showing an exemplary configuration of an email address checking apparatus according to a first embodiment of the present invention that checks the destination email addresses of emails containing historical information.

The embodiments described below are not intended to restrict the invention as set forth in the appended Claims. Also, not all elements described in these embodiments are essential to the invention. The present invention can be carried out in many different modes and should not be construed as being limited to the descriptions of the embodiments described below. Same elements are given same reference numerals throughout the specification and drawings.

Referring now to the accompanying drawings, there will be specifically described an email address checking apparatus according to a first embodiment of the present invention that checks whether, with respect to an email containing historical information that cites emails previously exchanged between multiple users, a destination email address in the email includes a part or all of an email address contained in the historical information.

In the first embodiment, an email address checking apparatus preferably obtained by installing a computer program into a computer system will be described. However, as is apparent for those skilled in the art, a part of the present invention may be carried out as a computer program executable by a computer. Accordingly, the present invention can be embodied as hardware, which is an apparatus that checks a destination email address set in an email containing historical information, as software, or a combination of software and hardware. The above-mentioned computer program may be stored in any computer-readable storage medium, such as a hard disk, a digital versatile disc (DVD), a compact disc (CD), an optical storage device, or a magnetic storage device.

The first embodiment checks whether a destination email address contains the domain name of an email address contained in the historical information cited in the email. This can prevent the email containing the historical information from being sent to an unintended destination, to which the user does not need or want to disclose the cited historical information, thereby maintaining confidentiality.

FIG. 1 is a block diagram showing an exemplary configuration of an email address checking apparatus 1 according to a first embodiment of the invention, which checks the destination email addresses of emails containing historical information. The email address checking apparatus 1 may be connected to multiple computers 3 via a network 2 so that this email address checking apparatus can perform data communications with these computers. The email address checking apparatus 1 sends or receives emails containing historical information to and from the computers 3 with one of the computers functioning as an email server.

The email address checking apparatus 1 may include a central processing unit (CPU) 11, a memory 12, a storage unit 13, an I/O interface 14, a video interface 15, a transportable disk drive 16, a communication interface 17 and an internal bus 18 that connects these hardware components. The CPU 11 is connected to the above-mentioned hardware components of the email address checking apparatus 1 via the internal bus 18. The CPU 11 controls the operations of the hardware components, as well as performs various software functions in accordance with a computer program 100 stored in the storage unit 13. The memory 12 may be a volatile memory, such as a static random access memory (SRAM) or synchronous dynamic random access memory (SDRAM). In executing the computer program 100, a load module is loaded into the memory 12, which in turn stores temporary data or the like generated by execution of the computer program 100.

The storage unit 13 may include a built-in, fixed storage device (hard disk), a read-only memory (ROM), or the like. The computer program 100 may be downloaded from a transportable storage medium 90, such as a DVD or CD-ROM, using the transportable disk drive 16 and stored in the storage unit 13. For execution, the computer program 100 is loaded from the storage unit 13 into the memory 12 and executed. The computer program 100 may be downloaded from one of the external computers 3 via the communication interface 17. The storage unit 13 includes a domain name storage unit 131. As will be described later, the domain name storage unit 131 stores the domain names of email addresses contained in the historical information section of an email.

Figure 2:
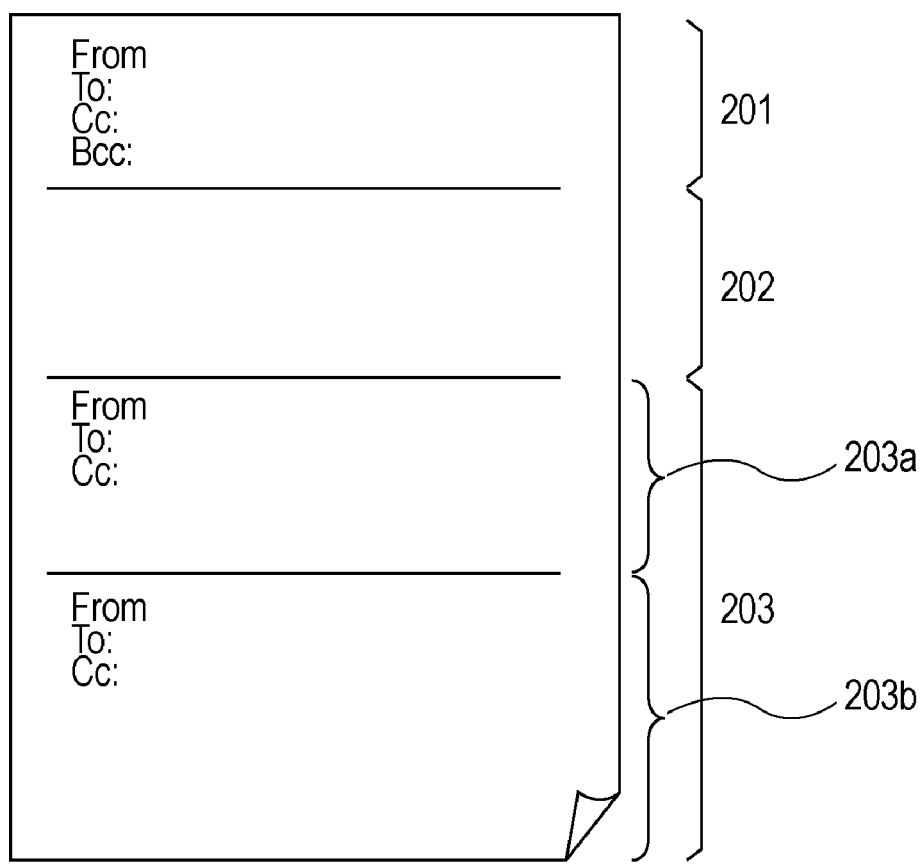
FIG. 2 is a drawing showing the structure of an email containing historical information according to the first embodiment.

The structure of an email containing historical information will now be described in detail. FIG. 2 is a drawing showing the structure of an email containing historical information according to the first embodiment. Referring to this figure, an email containing historical information consists of a header 201 containing a destination email address as a major component, a body 202 containing the message to be sent, and a historical information section 203 containing cited history information. A portion 203a of the historical information section 203 consists of the header and body of a received email, and a portion 203b thereof is the historical information section of the received email.

In the first embodiment, an email address consists of a local name, a sub-domain name, and a domain name. For an email address "satoh@jp.hoge2.com", "satoh" is the local name, "jp" is the sub-domain name, and "hoge2.com" is the domain name.

Returning to FIG. 1, the communication interface 17, which is connected to the internal bus 18, is connected to the external network 2, such as the Internet, a LAN or a WAN. Thus, the email address checking apparatus 1 can send and receive data to and from the external computers 3 and the like. The I/O interface 14 is connected to data input devices, such as a keyboard 21 and a mouse 22, to receive data input. The video interface 15 is connected to a display device 23, such as a CRT monitor or LCD, to display images.

The operation of the email address checking apparatus 1 will now be described.

Figure 3:
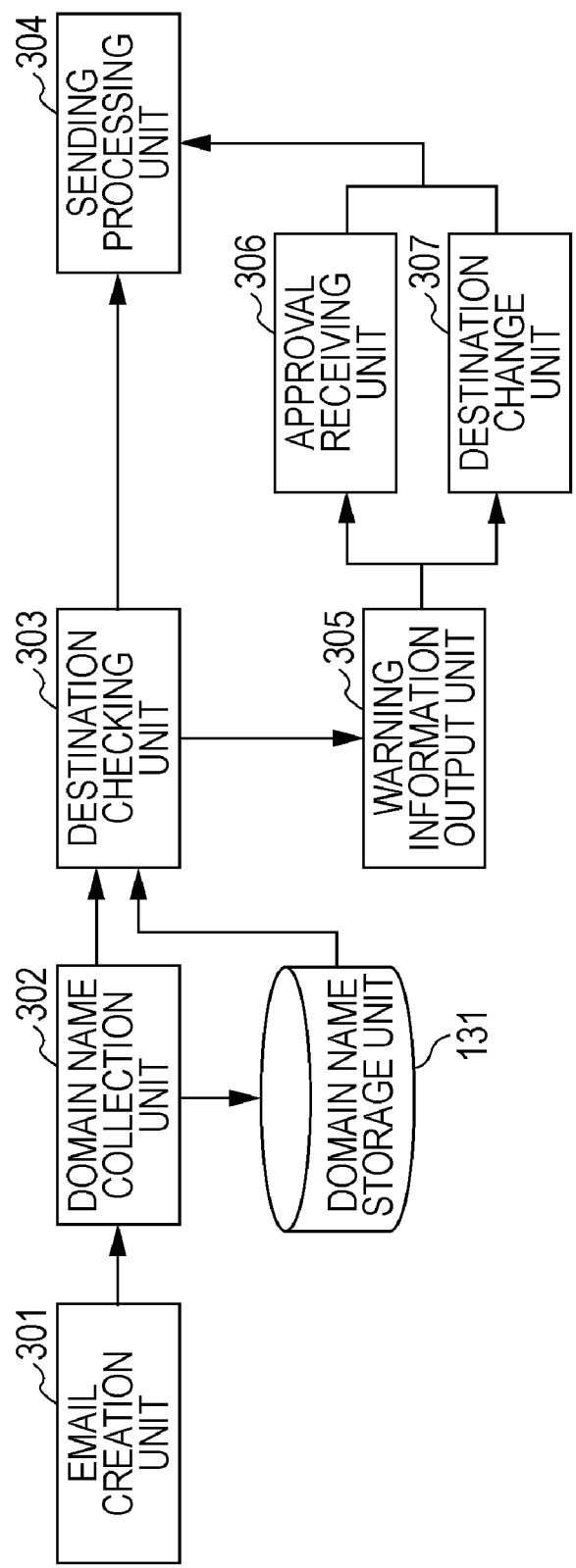
FIG. 3 is a diagram showing functional blocks of the email address checking apparatus according to the first embodiment.

FIG. 3 is a diagram showing functional blocks of the email address checking apparatus 1 according to the first embodiment. Referring to this figure, in order to reply to or forward a received email, an email creation unit 301 creates an email containing historical information that cites emails exchanged between multiple users, including the received email, while receiving input using the keyboard 21 or mouse 22.

A domain name collection unit 302 collects the domain name of an email address from the historical information section 203 of the email created by the email creation unit 301. Specifically, if the historical information section 203 contains an email address "satoh@jp.hoge2.com", the domain name collection unit 302 collects the domain name thereof "hoge2.com". If the historical information section 203 contains multiple email addresses, the domain name collection unit 302 collects multiple domain names thereof, except for duplicates.

The domain name storage unit 131 stores the domain name collected by the domain name collection unit 302 in such a manner that the domain name is associated with the corresponding email containing the historical information. If the domain name collection unit 302 collects multiple domain names, the domain name storage unit 131 stores the domain names in such a manner that the domain names are associated with the corresponding single email containing the historical information.

A destination checking unit 303 checks whether the destination email address (reply destination or forward destination) set in the created email containing the historical information contains the domain name stored in the domain name storage unit 131. For example, if the historical information 131 stores the domain name "hoge2.com", the destination checking unit 303 checks whether the destination email address set in the email contains the domain name "hoge2.com."

If there are multiple destination email addresses, and if the destination checking unit 303 reveals that all the destination email addresses contain a domain name that's stored in the domain name storage unit 131, the sending processing unit 304 sends the email containing the historical information to the computers 3 via the network 2.

However, if after checking the destination email addresses the destination checking unit 303 reveals that the domain name of a destination email address is not stored in the domain name storage unit 131, a warning output unit 305 outputs a warning to the display device 23 indicating that sending the email to the destination email address is not approved. The method for outputting a warning is not limited to displaying the warning on the display device 23, as other methods such as sounding of an alarm may be used.

An approval receiving unit 306 receives input of send approval information indicating approval for sending to the destination email address corresponding to the warning outputted from the warning information output unit 305. The send approval information may be inputted by clicking on a button using the mouse 22 or may be inputted via the keyboard 21.

A destination change unit 307 changes the destination email address corresponding to the warning outputted from the warning information output unit 305. The destination email address may be changed by clicking on a different destination email address using the mouse 22, or it may be changed by directly entering a new destination email address using the keyboard 21.

When approval is given to send the email to the destination email address corresponding to the warning outputted from the warning information output unit 305, or the destination email address is changed to an email address required as a destination, the sending processing unit 304 sends the email containing the historical information to the computers 3 via the network 2.

Figure 4:
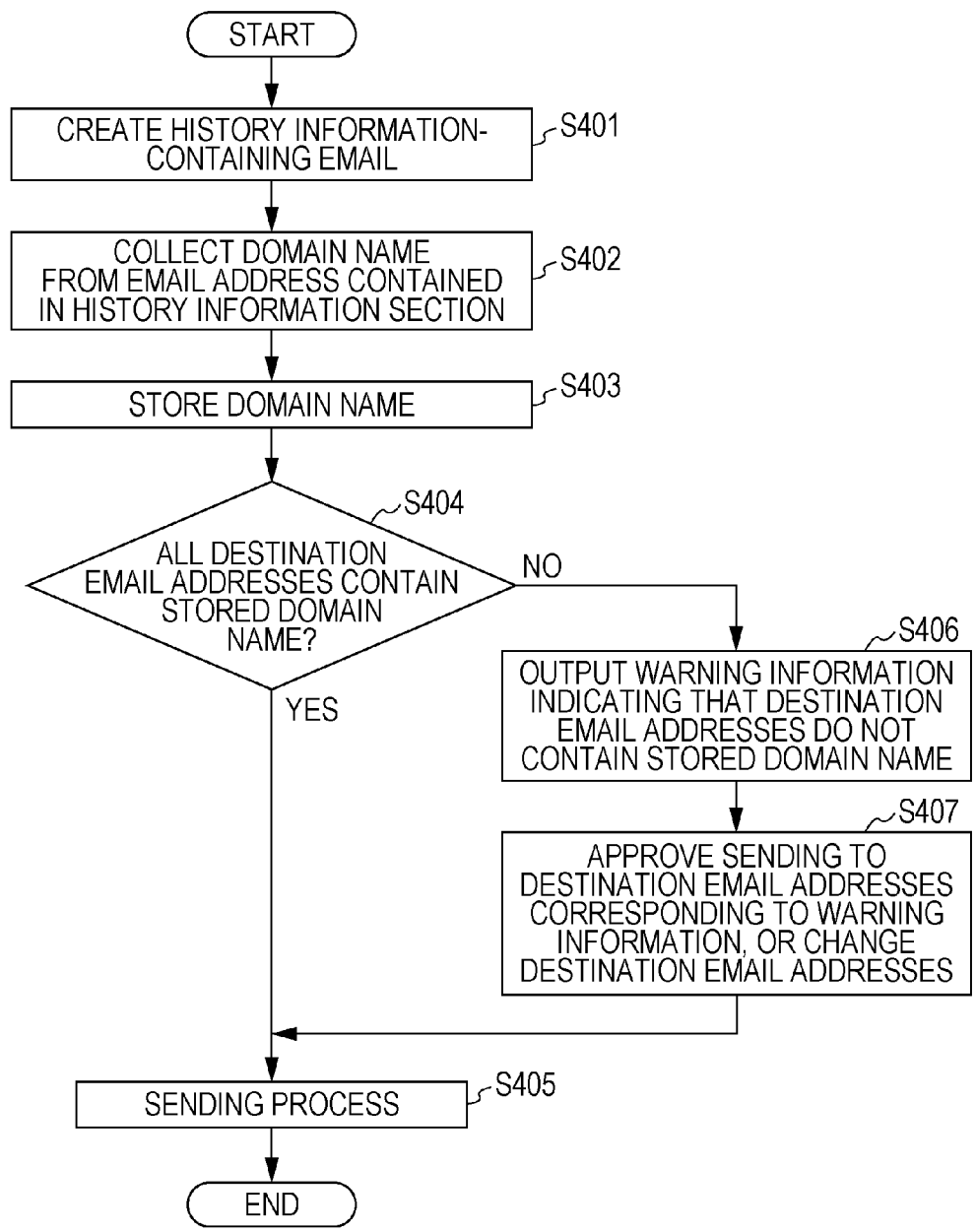
FIG. 4 is a flowchart showing the process steps performed by a CPU of the email address checking apparatus according to the first embodiment.

FIG. 4 is a flowchart showing the process steps that the CPU 11 of the email address checking apparatus 1 performs, according to the first embodiment. In order to reply to or forward a received email, the CPU 11 of the email address checking apparatus 1 creates an email containing the historical information of emails previously exchanged between multiple users, including the received email, on the basis of input from the keyboard 21 or mouse 22 (step S401).

The CPU 11 collects the domain name of an email address contained in the historical information section 203 of the created email (step S402). If the historical information section 203 contains multiple email addresses, the CPU 11 collects the multiple domain names thereof, except for duplicates. The CPU 11 stores the collected domain name in such a manner that the domain name is associated with the created email (step S403).

The CPU 11 checks whether all destination email addresses in the created email contain a domain name stored in the domain name storage unit 131 (step S404). If there are multiple destination email addresses and if multiple domain names are stored, the CPU 11 checks whether each of the destination email addresses contains one of the domain names stored in the domain name storage unit 131. If the CPU 11 determines that all the destination email addresses contain one of the domain names stored in the domain name storage unit 131 (YES in step S404), it sends the created email containing the historical information to the computers 3 via the network 2 (step S405).

If the CPU 11 determines that there exists destination email addresses having domain names that are not stored in the domain name storage unit 131(NO in step S404), it outputs a warning to the display device 23 that some of the destination email addresses do not contain a stored domain name (step S406).

The CPU 11 approves sending the email containing the historical information to the destination email addresses corresponding to the warning in response to a user input made via the keyboard 21 or mouse 22, or changes the destination email addresses corresponding to the warning (step S407). When completing the above-mentioned approval or change, the CPU 11 sends the email containing the historical information to the computers 3 via the network 2 (step S405).

Figure 5:
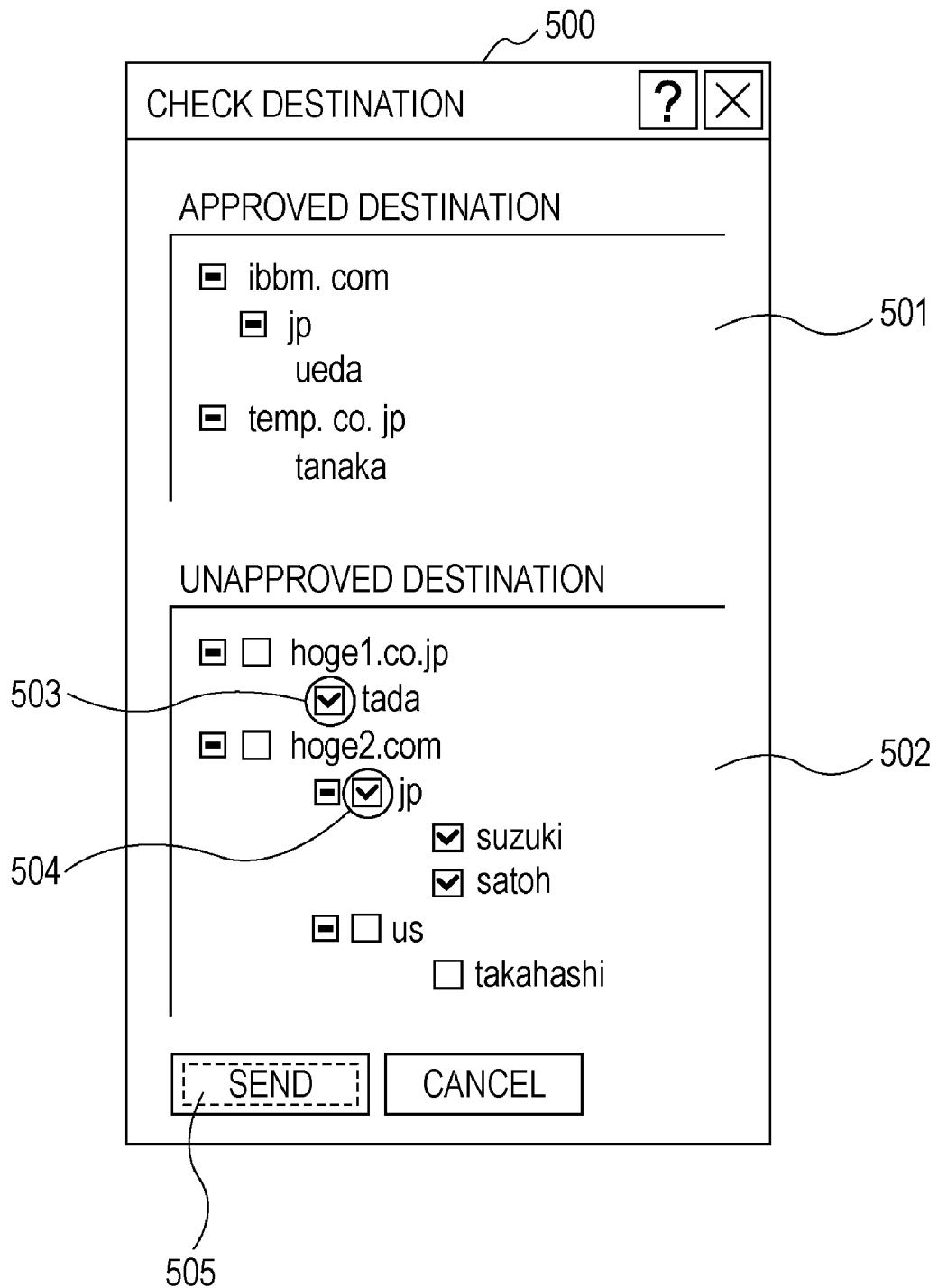
FIG. 5 is a drawing illustrating an operation window for giving send approval, of the email address checking apparatus according to the first embodiment.

An operation to approve sending the email to the destination email addresses corresponding to the outputted warning will now be described. FIG. 5 is a drawing illustrating an operation window for giving send approval of the email address checking apparatus 1 according to the first embodiment. Referring to this figure, the CPU 11 provides a warning indicating that at least one destination email address does not contain a domain name stored in the domain name storage unit 131 by displaying (preferably, on display device 23) a "check destination" warning window 500. The "check destination" warning window 500 is a window for indicating a warning, as well as a window for receiving send approval and a destination email address change. The "check destination" window 500 includes an approved destination section 501 and an unapproved destination section 502. The approved destination section 501 displays destination email addresses containing the domain name stored in the domain name storage unit 131. The unapproved destination section 502 displays destination email addresses not containing a domain name stored in the domain name storage unit 131.

The approved destination section 501 and unapproved destination section 502 display each email address hierarchically in the order of the domain name, sub-domain name, and local name. For an email address "suzuki@jp.hoge2.com", its domain name "hoge2.com" is displayed in the first level, its sub-domain name "jp" is displayed in the second level, and its local name "suzuki" is displayed in the third level. Displayed below the domain name "hoge2.com" of the first level is the sub-domain name "jp" of the second level, as well as a sub-domain name "us" of the second level. Displayed below the sub-domain name "us" of the second level is a local name "takahashi" of the third level. Displayed below the sub-domain name "jp" of the second level is a local name "suzuki" of the third level, as well as a local name "satoh" of the third level. For an email address "tada@hoge1.co.jp" having no sub-domain name, its domain name "hoge1.co.jp" is displayed in the first level and its local name "tada" is displayed in the second level.

In the unapproved destination section 502, a checkbox is provided in front of each domain name, sub-domain name, and local name. Each checkbox, when checked, functions as an approval to send information. Specifically, by using the mouse 22 to place a checkmark in the checkbox of a domain name, sub-domain name, or local name, the user gives send approval to the destination email address on a domain name, sub-domain name, or email address basis. For example, by placing a checkmark in the checkbox 503 provided for the local name "tada", send approval is given with respect to the email address name "tada@hoge1.co.jp." Also, by placing a checkmark in a checkbox 504 provided for the sub-domain name "jp", send approval is given with respect to the email address names "suzuki@jp.hoge2.com" and "satoh@jp.hoge2.com", which both have the domain name "hoge2.com" and the sub-domain name "jp". By pressing the send button 505 when send approval has been given with respect to all destination email addresses, the "check destination" window 500 is closed and the email containing the historical information is sent to the computers 3 via the network 2.

Figure 6:
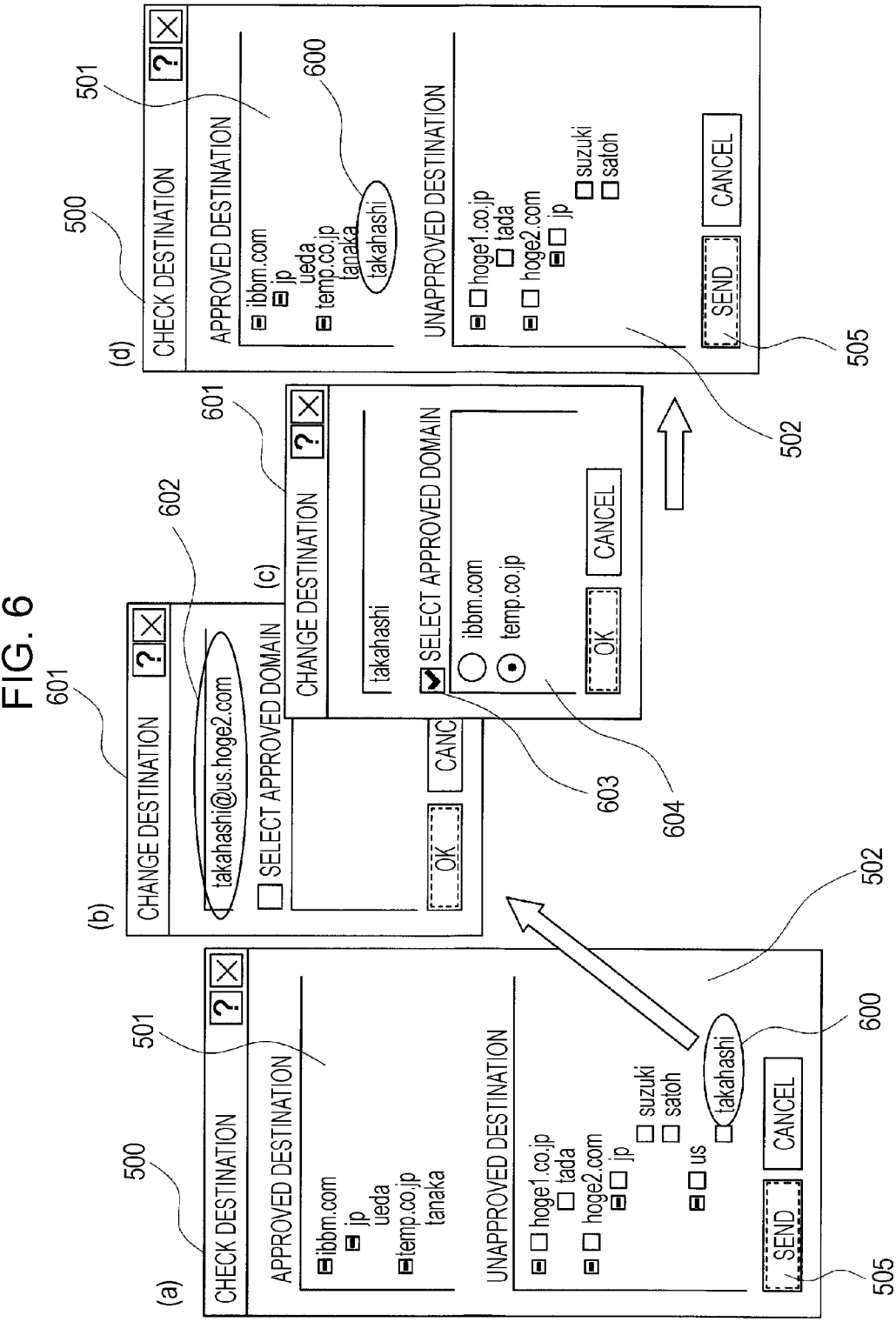
FIG. 6 is a drawing illustrating an operation window for changing destination email addresses, of the email address checking apparatus according to the first embodiment.

An operation for changing the destination email addresses corresponding to the outputted warning will now be described. FIG. 6 is a drawing illustrating an operation window for changing destination email addresses of the email address checking apparatus 1 according to the first embodiment. Referring to FIG. 6(*a*), the CPU 11 displays a warning indicating that destination email addresses do not contain the domain name stored in the domain name storage unit 131 by displaying on display device 23 the "check destination" window 500. Hereafter, a case where the email address "takahashi@us.hoge2.com" is displayed in the unapproved destination section 502 of the "check destination" window 500 is changed to "takahashi@temp.co.jp" will be described.

When clicking a label 600 of the local name "takahashi" using the mouse 22, the CPU 11 displays a "change destination" window 601 on the display device 23, as shown in FIG. 6(*b*). The "change destination" window 601 displays the email address "takahashi@us.hoge2.com" in a box 602 for displaying an email address to be changed. The email address "takahashi@us.hoge2.com" may be changed to "takahashi@temp.co.jp" by directly editing the email address in the box 602 using the keyboard 21 or mouse 22.

As for the email address "takahashi@us.hoge2.com" displayed in the unapproved destination section 502, the local name thereof is correct and the sub-domain name and domain name are wrong. Accordingly, the email address may be changed using multiple domain names stored in the domain name storage unit 131. Specifically, as shown in FIG. 6(*c*), placing a checkmark in a "select approved domain" checkbox 603 of the "change destination" window 601 causes multiple domain names stored in the domain name storage unit 131 to appear in a box 604. Since a radio button is provided in front of each of the domain names displayed in the box 604, the email address can be changed by clicking and selecting a domain name required as a destination using the mouse 22. In the above-mentioned example, selection of a domain name "temp.co.jp" changes the email address to the email address name "takahashi@temp.co.jp."

FIG. 6(*d*) shows the "check destination" window 500 displayed after changing the email address to "takahashi@temp.co.jp." In the changed "check destination" window 500, the label 600 of the local name "takahashi" has been deleted from the unapproved destination section 502 along with the sub-domain name "us" and the label 600 of the local name "takahashi" has been displayed below the domain name "temp.co.jp" in the approved destination section 501. By pressing the send button 505 when completing the change of the unapproved destinations to email addresses required as destinations, the "check destination" window 500 is closed and the email containing historical information is sent to the computers 3 via the network 2.

Figure 7:
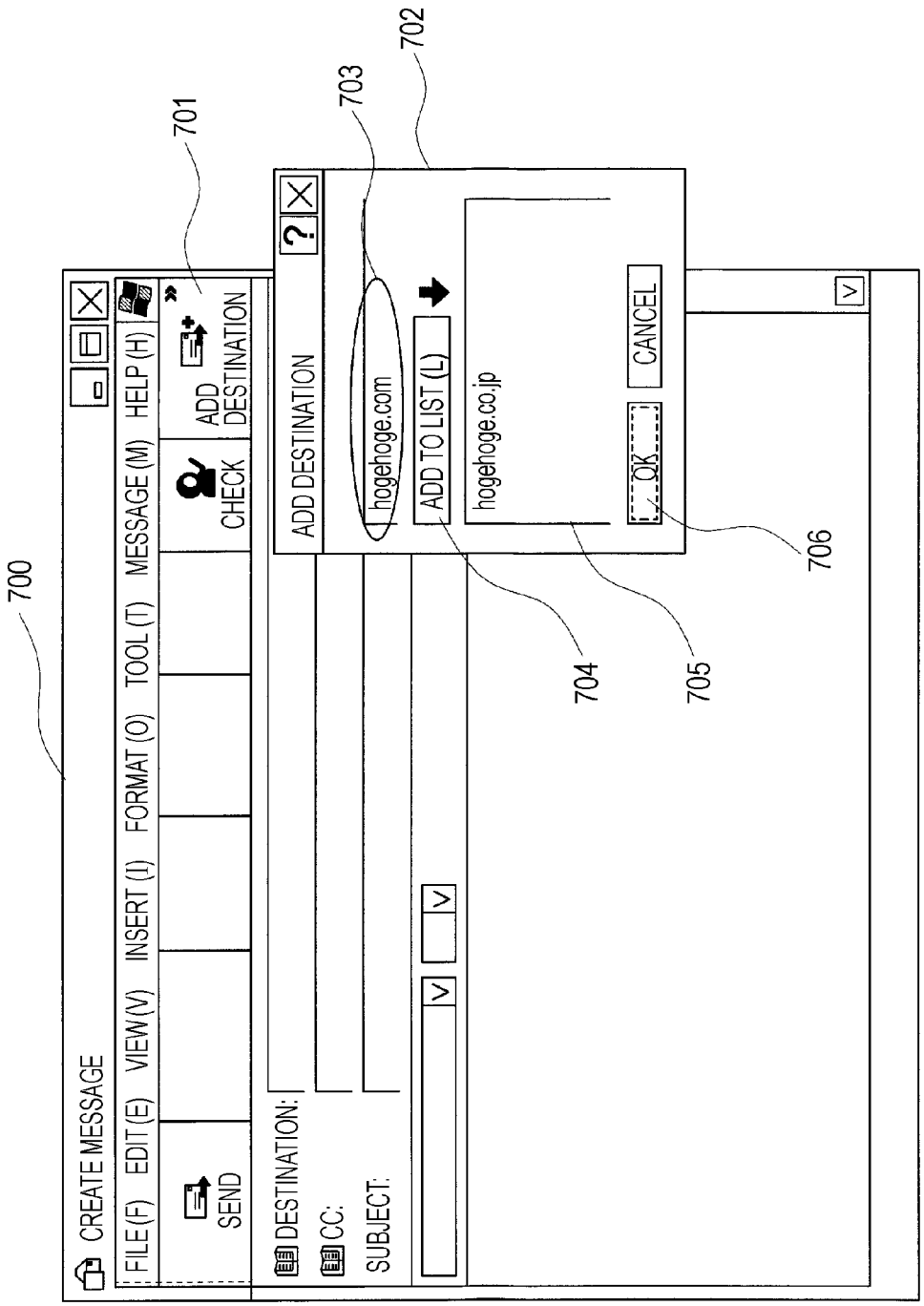
FIG. 7 is a drawing illustrating an operation window for adding a domain name, to which the user wishes to give send approval, of the email address checking apparatus according to the first embodiment.

In the operations shown in FIGS. 5 and 6, approval for sending to the destination email addresses is given or the destination email addresses are changed, based on a warning indicating that the destination email addresses do not contain the stored domain name. However, the email creation unit 301 according to the first embodiment may previously add a domain name to which the user wishes to give send approval (approved domain name) regardless of the presence or absence of a warning. Referring now to the drawings, an operation where the email creation unit 301 previously adds an approved domain name will be described specifically. FIG. 7 is a drawing illustrating an operation window for adding a domain name, to which the user wishes to give send approval, of the email address checking apparatus 1 according to the first embodiment.

In creating an email containing historical information (email for reply or forwarding), the email creation unit 301 displays a "create message" window 700 on the display device 23, as shown in FIG. 7. By receiving user input from the keyboard 21 or mouse 22, the email creation unit 301 fills predetermined sections of the "create message" window 700 to create an email containing historical information. In adding an approved domain name to the email containing the historical information in advance, an "add destination" window 702 is displayed on the display device 23 by pressing an "add destination" button 701 of the "create message" window 700. Entering an approved domain name (e.g., "hogehoge.com") into a box 703 of the displayed "add destination" window 702 and pressing an "add to list" button 704 adds the approved domain name to a list box 705 ("hogehoge.co.jp" is already added to the list).

Figure 8:
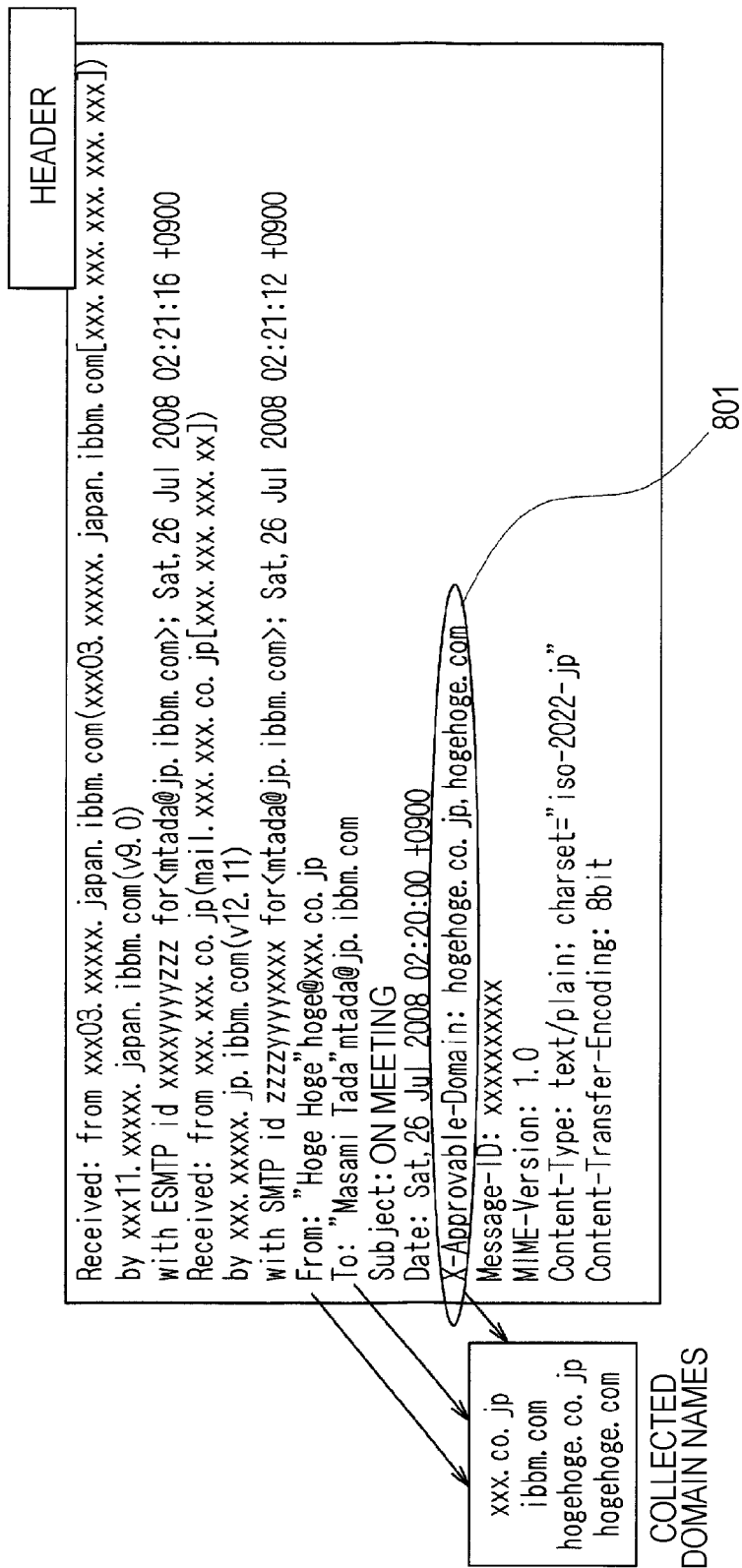
FIG. 8 is a drawing illustrating the header of an email containing historical information additionally containing domain names, to which the user wishes to give send approval, according to the first embodiment.

Pressing an "OK" button 706 when adding all desired approved domain names in the "add destination" window 702 closes the "add destination" window 702. By performing the above-mentioned operation, the email creation unit 301 adds the approved domain names to the header of the email containing the historical information. FIG. 8 is a drawing illustrating the header of the email containing the historical information according to the first embodiment where domain names, to which the user wishes to give send approval, have been added. As shown in FIG. 8, the approved domain names (e.g., "hogehoge.com", "hogehoge.co.jp") added using the "add destination" window 702 are additionally disposed in an "X-Approvable-Domain" row 801 of the header of the email containing historical information.

When the domain name collection unit 302 collects domain names from the email containing an email address in the historical information section, where the approved domain names have been added to the header thereof, it also collects the previously added approved domain names. For example, from the header shown in FIG. 8, the domain name collection unit 302 can collect the domain name of the source, "xxx.co.jp", and the domain name of the destination, "ibbm.com", as well as the added approved domain names "hogehoge.co.jp" and "hogehoge.com". As seen, by adding the approved domain names to the header, sending of any email containing historical information to the approved domain names can be approved as long as the email containing historical information includes the header in the historical information section thereof. Particularly in a case where different domain names are set for the same company, adding the company's different domain names to the header as approved domain names in creating a new email will prevent appearance of a warning in exchanging an email containing historical information later, as long as the destinations thereof are intra-company addresses.

As seen, in a case where multiple users exchange emails containing historical information with each other, the first embodiment checks whether the destination email address of the email containing historical information contains the domain name of an email address contained in the cited historical information. This can prevent the email from being sent to an unintended destination, to which the user does not need to disclose the cited historical information, thereby maintaining confidentiality.

The present invention is not limited to the above-mentioned embodiment and various changes, modifications, and the like can be made thereto without departing from the spirit and scope of the invention. Instead of collecting the domain name of an email address contained in the historical information and checking whether the destination email address contains the domain name, it is possible to collect the sub-domain name of an email address contained in the historical information section or the entire email address and check whether the destination email address contains the sub-domain name or entire email address. Also, all the elements of the email address checking apparatus 1 shown in FIG. 3 may be constituted by multiple computers rather than a single computer. For example, the email creation unit 301 and the domain name collection unit 302, destination checking unit 303, and domain name storage unit 131 may be constituted by another computer.

According to a second embodiment, in the email address checking apparatus 1 according to the first embodiment, the domain name collection unit 302 collects the domain names from the historical information section of the email containing historical information created by the email creation unit 301. However, the domain name collection unit 302 may collect domain names not only from the email containing the historical information created by the email creation unit 301, but also from emails exchanged between multiple users before the email containing the historical information is created. Accordingly, in the email address checking apparatus 1, the domain name collection unit 302 collects a domain name from an email address received by the email creation unit 301 will be described in a second embodiment of the present invention. The example configuration and functional blocks of the email address checking apparatus 1 according to the second embodiment are the same as those of the email address checking apparatus 1 according to the first embodiment and will not be described in detail.

Note that in FIG. 3, the domain name collection unit 302 collects the domain name of an email address from an email received by the email creation unit 301 before the email creation unit 301 creates an email (email containing the historical information) in order to reply to or forward a received email. In a case where the email received by the email creation unit 301 consists of a header and a body, the domain name collection unit 302 collects the domain name of an email address from the header and body. Also, in a case where the email received by the email creation unit 301 consists of a header, a body, and a historical information section, the domain name collection unit 302 collects the domain name of an email address from the header, body, and historical information section.

Figure 9:
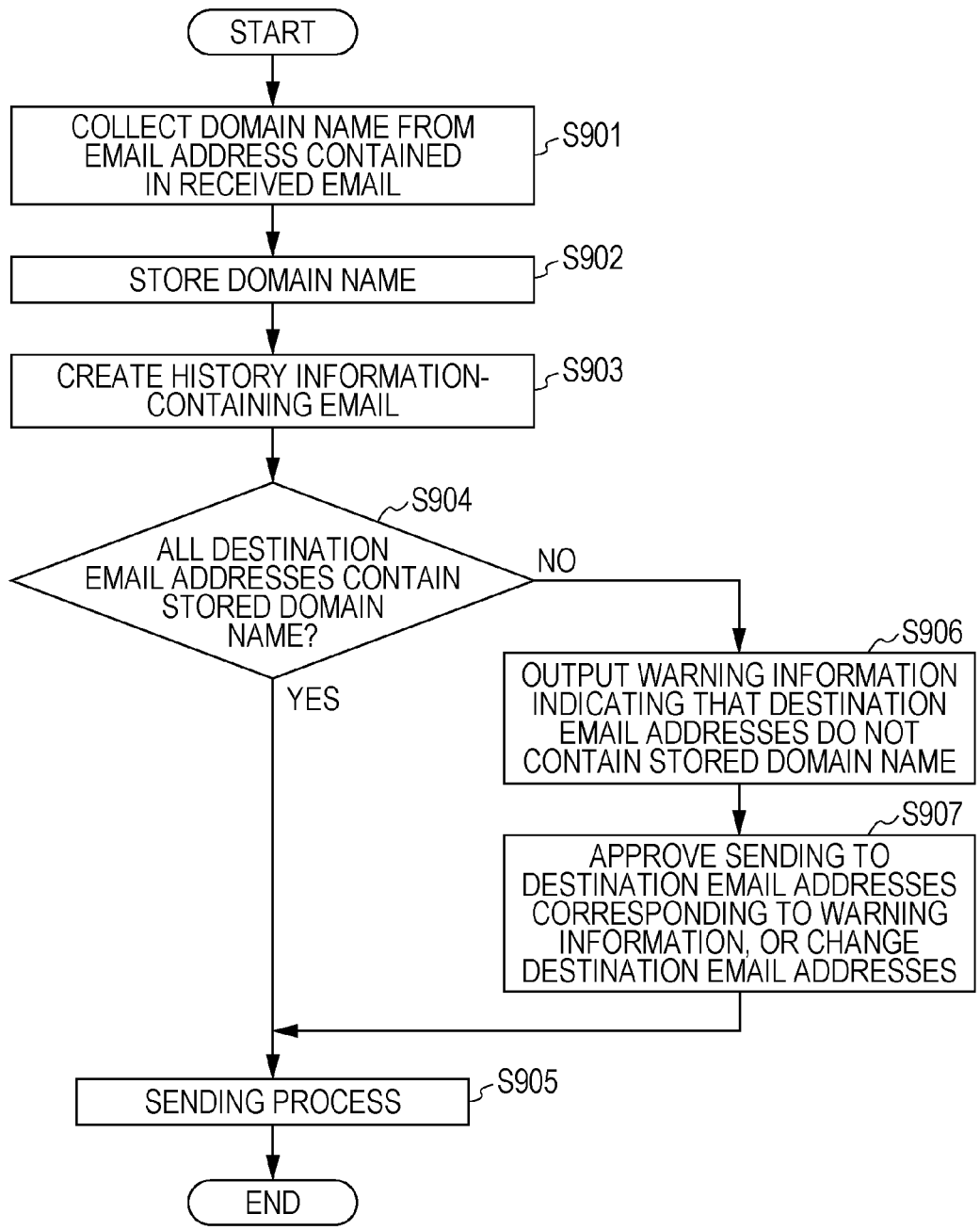
FIG. 9 is a flowchart showing the process steps performed by a CPU of an email address checking apparatus according to a second embodiment of the present invention.

FIG. 9 is a flowchart showing the process steps of the CPU 11 of the email address checking apparatus 1 according to the second embodiment performs. The CPU 11 of the email address checking apparatus 1 collects the domain name of an email address contained in a received email (step S901). The CPU 11 stores the collected domain name in such a manner that the domain name is associated with the received email (step S902). Subsequently, the CPU 11 performs the same processes in steps S903, S904, S905, S906, and S907 as those in steps S401, S404, S405, S406, and S407, respectively, shown in FIG. 4 and will be not be described in detail.

As seen, the second embodiment checks whether the destination email address of an email containing historical information contains the domain name of an email address contained in emails exchanged between multiple users before the email containing the historical information is created. This can prevent the email containing the historical information from being sent to an unintended destination, to which the user does not need to disclose the cited historical information, thereby maintaining confidentiality. Also, the second embodiment collects the domain name of an email address contained in a received email before creating an email containing historical information. Accordingly, when setting a destination email address in the created email containing historical information, the second embodiment can check whether the destination email address contains the domain name.

The present invention is not limited to the above-mentioned embodiment and various changes, modifications, and like can be made thereto without departing from the spirit and scope of the invention. For example, instead of collecting the domain name of an email address contained in emails exchanged between multiple users and checking whether the destination email address contains the domain name, it is possible to collect the sub-domain name of an email address contained in emails exchanged between multiple users or the entire email address and check whether the destination email address contains the sub-domain name or entire email address.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium having computer readable program code embodied thereon.

Any combination of one or more computer readable medium may be utilized. The computer readable medium may be a computer readable signal media or a computer readable storage media. A computer readable storage media may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing. In the context of this document, a computer readable storage media may be any tangible medium that can contain, or store a program for use by or in connection with an instruction execution system, apparatus or device.

A computer readable signal media may include a propagated data signal with computer readable program code embodied therein; for example, in baseband or as part of a carrier wave. Such a propagated signal may take any of a variety of forms, including, but not limited to, electro-magnetic, optical or any suitable combination thereof. A computer readable signal media may be any computer readable medium that is not a computer readable storage media and that can communicate, propagate, or transport a program for use by or in connection with an instruction execution system, apparatus or device. Program code embodied in a computer readable signal media may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable media that can direct a computer, other programmable data processing apparatus, or other devices to function in a particular manner, such that the instructions stored in the computer readable media produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flowchart and/or block diagram block or blocks.

What is claimed is:

1. A method, comprising:
    creating a first email comprising a header and historical information, the header comprising a first destination email address, and the historical information comprising a historical email address for a previously exchanged email;
    storing in a storage unit, at least a portion of the historical email address contained in the historical information as a first approved address;
    comparing the first approved address to a corresponding portion of the first destination email address;
    in response to the corresponding portion of the first destination email address being different from the first approved address as stored in the storage unit, outputting a warning, wherein the warning comprises an approved address list that comprises the first approved address, and wherein the warning further comprises an unapproved address list that comprises the first destination email address;
    receiving an input to change the first destination email address to the first approved address; and
    sending the first email comprising the historical information to the first approved address.

2. The method of claim 1, wherein the method further comprises:
    receiving an input to approve sending the first email comprising the historical information to the first destination email address.

3. The method of claim 1, wherein the method further comprises:
    receiving an input to substitute a second approved address for the first destination email address; and
    sending the first email comprising the historical information to the second approved address.

4. The method of claim 1, further comprising:
    adding a second destination email address to the header of the first email;
    adding the second destination email address to the historical information of the first email; and
    storing in the storage unit the second destination email address as a second approved address.

5. The method of claim 1, further comprising:
    receiving a second email, the second email being received prior to the creation of the first email, the second email comprising a sender email address; and
    storing in the storage unit the sender email address as a second approved address.

6. An apparatus, comprising:
    a storage device comprising computer executable program code; and
    a processor coupled to the storage device, wherein the processor executes the computer executable program code to direct the apparatus to:
        create a first email comprising a header and historical information, the header comprising a first destination email address, and the historical information comprising a historical email address for a previously exchanged email;
        store at least a portion of the historical email address contained in the historical information as a first approved address;
        compare the first approved address to a corresponding portion of the first destination email address;
        in response to the corresponding portion of the first destination email address being different from the first approved address, output a warning, wherein the warning comprises an unapproved address list that comprises the first destination email address;
        receive an input to substitute a second approved address for the first destination email address; and
        send the first email comprising the historical information to the second approved address.

7. The apparatus of claim 6, wherein the processor further executes the computer executable program code to direct the apparatus to receive an input to approve sending the first email comprising the historical information to the first destination email address.

8. The apparatus of claim 6, wherein the warning further comprises an approved address list comprising the first approved address and wherein the processor further executes the computer executable program code to direct the apparatus to:
  receive an input to change the first destination email address to the first approved address; and
  send the first email comprising the historical information to the first approved address.

9. The apparatus of claim 6, wherein the processor further executes the computer executable program code to direct the apparatus to:
  add a second destination email address to the header of the first email;
  add the second destination email address to the historical information of the first email; and
  store the second destination email address as a second approved address.

10. The apparatus of claim 6, wherein the processor further executes the computer executable program code to direct the apparatus to:
  receive a second email, the second email being received prior to the creation of the first email, the second email comprising a sender email address; and
  store the sender email address as a second approved address.

11. A computer program product comprising a non-transitory computer readable storage medium having computer readable program code embodied therewith, wherein the computer readable program code when executed on a computer causes the computer to:
  create a first email comprising a header and historical information, the header comprising a first destination email address, and the historical information comprising a historical email address for a previously exchanged email;
  store at least a portion of the historical email address contained in the historical information as a first approved address;
  compare the first approved address to a corresponding portion of the first destination email address;
  in response to the corresponding portion of the first destination email address being different from the first approved address, output a warning, wherein the warning comprises an approved address list that comprises the first approved address, and wherein the warning further comprises an unapproved address list that comprises the first destination email address;
  receive an input to change the first destination email address to the first approved address; and
  send the first email comprising the historical information to the first approved address.

12. The computer program product of claim 11, wherein the computer readable program code when executed on the computer further causes the computer to receive input to approve sending the first email comprising the historical information to the first destination email address.

13. The computer program product of claim 11, wherein the computer readable program code when executed on the computer further causes the computer to:
  receive an input to substitute a second approved address for the first destination email address; and
  send the first email comprising the historical information to the second approved address.

14. The computer program product of claim 11, wherein the computer readable program code when executed on the computer further causes the computer to:
  add a second destination email address to the header of the first email;
  add the second destination email address to the historical information of the first email; and
  store the second destination email address as a second approved address.

15. The computer program product of claim 11, wherein the computer readable program code when executed on the computer further causes the computer to:
  receive a second email, the second email being received prior to the creation of the first email, the second email comprising a sender email address; and
  store the sender email address as a second approved address.

* * * * *